H. L. Brown,
Silk Winding.

No. 81,874. Patented Sep. 8, 1868.

Witnesses.
J. M. Stancliff.
E. M. Bass.

Inventor:
Henry L. Brown
By Jeremy W. Bliss.

United States Patent Office.

HENRY L. BROWN, OF MANSFIELD CENTRE, CONNECTICUT.

Letters Patent No. 81,874, dated September 8, 1868.

IMPROVEMENT IN SILK-WINDING MACHINERY.

The Schedule referred to in these Letters Patent and making part of the same.

TO ALL WHOM IT MAY CONCERN:

Be it known that I, HENRY L. BROWN, of Mansfield Centre, county of Tolland, and State of Connecticut, have invented certain new and useful Improvements in Silk-Winding; and to enable others skilled in the art to make and use the same, I will proceed to describe its construction and operation, by referring to the drawings, in which the same letters indicate like parts in each of the figures.

The nature of this invention consists in arranging mechanism in connection with the spools or reels (upon which the skein of raw silk is placed) so as to work automatically to change the relative parallel position of one spool or reel with the opposite spool or reel, to prevent the fibres from packing, piling, or kinking.

Heretofore, the arms or spools, upon which the skeins are placed for winding, have been, for the most part, parallel one with the other. Some efforts in the direction of remedying this disposition to pile have been made, by changing the parallelism from time to time by hand, regulated only by the indicated disposition to pile or kink.

Now, in order to overcome the piling disposition of the silk, while being wound from the skein in the common way, I propose to arrange, in connection with the ordinary device upon which the skein of silk is placed, an automatic change-motion, which shall vibrate one or both arms or spools, so that their relative parallel position shall successively change into a diverging position, first in one direction, then in the opposite direction, thus producing the effect of keeping the thread to be wound from the skein free from kinking and breaking, whereby it may be wound more rapidly, with a great saving in time and labor.

In the accompanying drawings—

Figure 1:
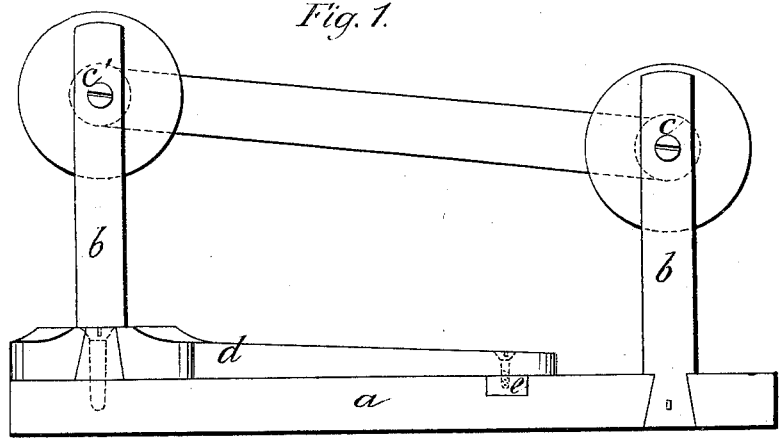
Figure 1 is a side view of this invention.
Figure 2:
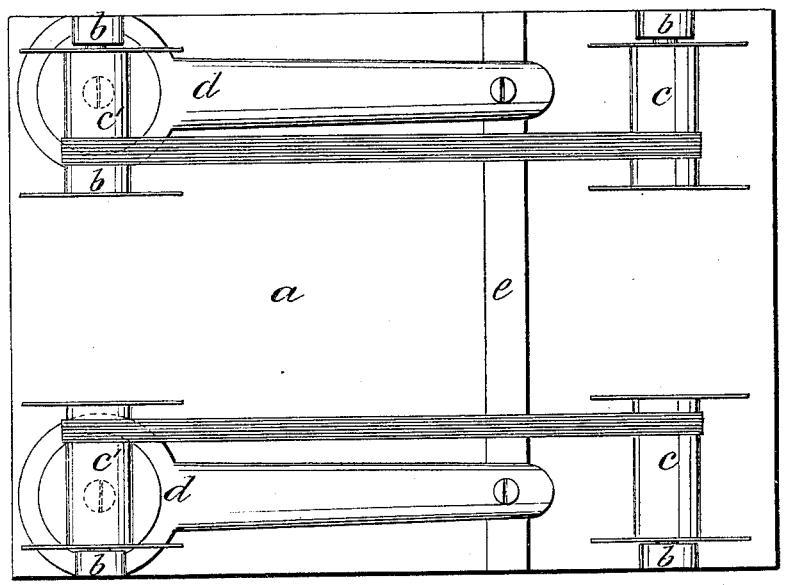
Figure 2 is a top view.

$a$ represents the framework of the machine.

$b$ are posts or portions of the framework.

$c$ are revolving arms or spools, secured and turned upon spindles in the posts $b$.

$d$ are vibrating arms, secured or arranged upon the framework, in which one of the posts, $b$, and spools may be secured. The outer ends of these arms are secured to a connecting-rod, $e$, and the end of this connecting-rod, $e$, is attached to a crank-pin or any of the common motors or devices for producing a reciprocating motion.

Thus, it will be seen that when the skein is placed upon the spool $c$, and the winding-machine is set in motion, one or both of the arms or spools $c$ $c'$ will constantly be changing its position, relatively to each other, and, by so doing, the threads are kept loosened and free from piling.

I believe I have thus shown the nature, construction, and advantage of this invention, so as to enable others skilled in the art to make and use the same therefrom.

What I claim, therefore, and desire to secure by Letters Patent, is—

The arrangement of the spools $c$ $c'$, arms $d$, and connecting-rod $e$, in a silk-winding machine, so as to produce an automatic vibratory change-motion of one spool, relatively to the other, substantially as described.

HENRY L. BROWN. [L. S.]

Witnesses:
JOHN A. PARKER.
L. D. BROWN.